UNITED STATES PATENT OFFICE.

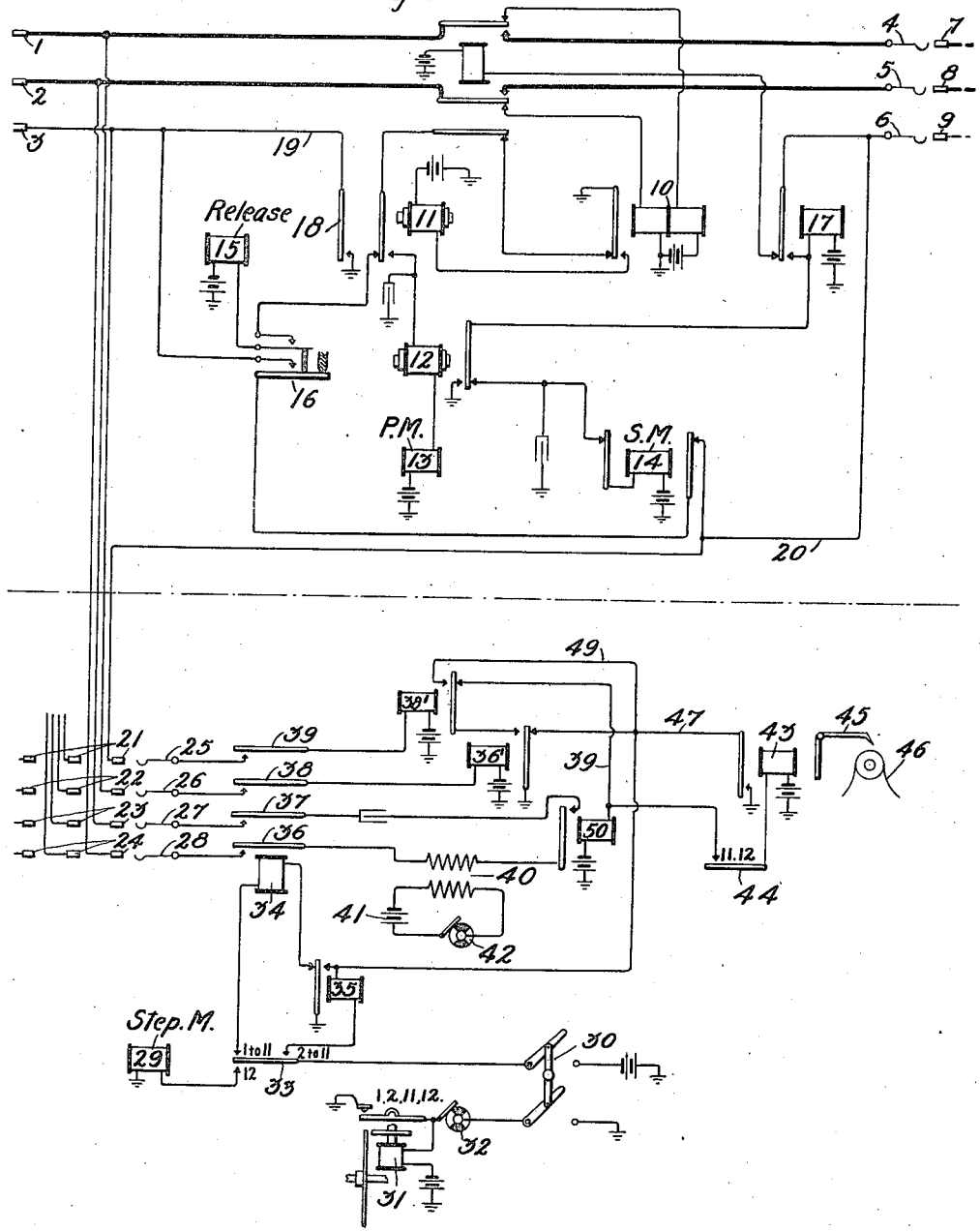

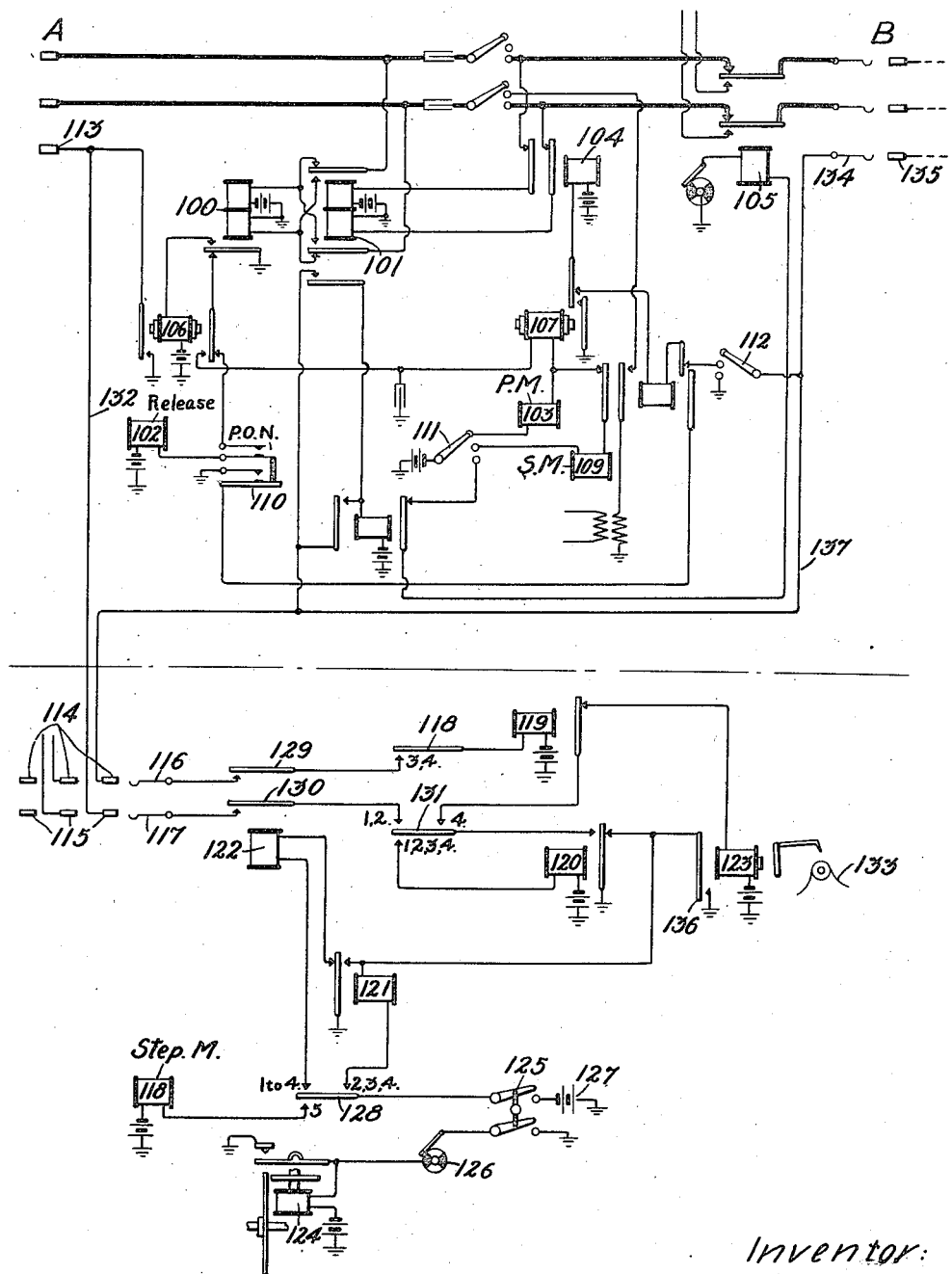

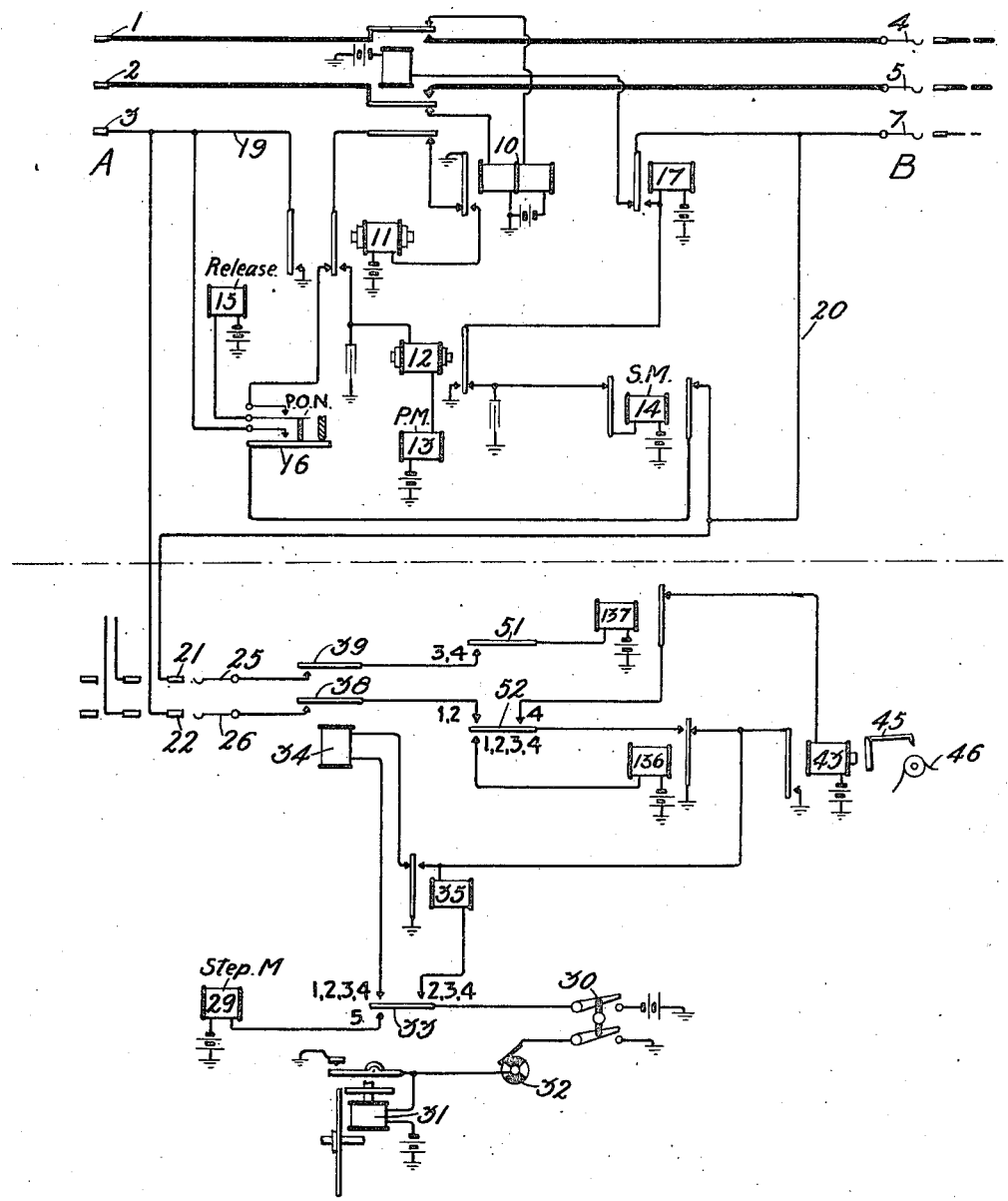

HENRY P. CLAUSEN, OF MOUNT VERNON, NEW YORK, ASSIGNOR TO WESTERN ELECTRIC COMPANY, INCORPORATED, OF NEW YORK, N. Y., A CORPORATION OF NEW YORK.

AUTOMATIC TESTING SYSTEM.

1,224,140.

Specification of Letters Patent.

Patented May 1, 1917.

Application filed July 24, 1916. Serial No. 110,967.

*To all whom it may concern:*

Be it known that I, HENRY P. CLAUSEN, a citizen of the United States, residing at Mount Vernon, in the county of Westchester and State of New York, have invented certain new and useful Improvements in Automatic Testing Systems, of which the following is a full, clear, concise, and exact description.

This invention relates to an automatic testing system and more particularly to an arrangement for locating unstandard conditions in electrical circuits and apparatus.

It is an object of the present invention to provide an automatic arrangement which will perform certain testing and recording operations, which operations have heretofore been performed by an attendant.

In electrical systems, and more particularly in systems such as telephone exchange systems where a large number of circuits and a quantity of apparatus is used, it is necessary to ascertain at frequent intervals if the system is operating in the standard manner in order to eliminate the disturbing element in case the system is not operating in the standard manner. It has previously been the practice for an attendant to connect at fixed intervals certain testing instruments to various parts of the system and to deduce from the operation of such testing instruments whether the system is operating in the standard manner. Deviations from standard conditions have heretofore been commonly referred to as abnormal conditions, faults or cases of trouble, However, owing to the fact that in modern complex systems certain apparatus may be in an off-normal position or in an abnormal condition, while the operation of the system is in accordance with standard conditions, the term "unstandard condition" has been employed in this specification to indicate any condition which is not encountered in the standard operation of the circuits or apparatus under test. Further than this, the term "unstandard condition" is commonly used among workers in the art to indicate either faults, cases of trouble or any condition not in accordance with the standard operation.

In accordance with a feature of the present invention, testing means are provided which are responsive to an electrical condition indicating an unstandard condition in the circuit or apparatus to which it is connected. Means are also provided to discriminate between an electrical condition due to a standard condition and one due to an unstandard condition. Also in accordance with a feature of the invention, means are provided for automatically disconnecting the testing means in case only standard conditions are found or in case the particular part of the system under test is not in use. A recording or an alarm device is also provided which is controlled from the testing means.

In accordance with a further feature of the invention, means is provided to cause the operation of a signaling device if an unstandard condition has been found to notify an attendant of the existence of such unstandard condition, and means are also provided to prevent the operation of the recording means if in response to the signaling device the unstandard condition is removed.

In its most complete form, the arrangement of the invention is adapted first to test and ascertain if the system or the part of the system under test is in use; secondly, to test whether an unstandard condition exists; third, to cause the operation of the signal to call attention to the presence of such unstandard condition, and fourth, to record the presence of such unstandard condition if such unstandard condition still exists and has not been removed in response to the operation of the signaling device.

Although the arrangement of the invention may be applied to test for any unstandard condition, irrespective of the character of such unstandard condition or the apparatus or circuits until such unstandard condition occurs, the arrangement of the invention is particularly applicable for the purpose of testing for unstandard condition in automatic or semi-automatic telephone exchange systems, and the invention will be described as applied to a system of this character.

In the drawings, Figure 1 shows diagrammatically an arrangement for testing for faults or unstandard operations in a selector switch, such as is commonly used in automatic or semi-automatic telephone exchange systems.

Fig. 2 shows an arrangement for testing for faults or unstandard conditions in a connector switch, such as commonly used in automatic or semi-automatic telephone exchange systems.

Fig. 3 is a modified form of the arrangement shown in Fig. 1.

Referring now to the drawings, in Fig. 1 the circuits and apparatus located above the broken line form part of the usual circuits and apparatus of a selector switch, and the part below the broken line shows apparatus and circuits employed for the purpose of carrying out certain routine tests of the above mentioned selector switch. The incoming terminals of the selector switch are indicated at 1, 2 and 3, and the outgoing brushes at 4, 5 and 6, the outgoing terminals of the selector switch being indicated as 7, 8 and 9. The selector switch, which is diagrammatically indicated, is of the type in which the switch is first given a step-by-step vertical movement in response to controlling impulses and is then given a step-by-step rotary movement independent of external controlling impulses, this type of selector switch being well known in the art. The usual line relay is indicated at 10, and a slow-acting relay controlled thereby is indicated at 11; a second slow-acting relay 12 is shown in series with the usual primary magnet 13, and the secondary magnet is indicated at 14. The usual release magnet is indicated at 15; the vertical off-normal switch at 16, and the private relay at 17. The operation of the apparatus and circuits described thus far is well known and will not be described in detail. In a switch of this character, a common unstandard condition occurs when a subscriber removes his receiver from the hook, and abandoning the call which he has thus initiated, fails to restore the receiver to its hook. This results in the energization of the line relay 10 and the consequent energization of the slow-acting relay 11, which will place a ground upon the terminal 3 from the armature 18, through the conductor 19. A ground, however, may be placed upon the terminal 3 and the conductor 19 in the standard operation of the switch; for example if the switch has been taken for use and has extended a connection to another selector switch or connector, a ground will be connected through such other connector switch or selector to the terminal 9, and through the brush 6, conductor 20, vertical off-normal switch 16, which is now closed, to the conductor 19. However, as will more clearly appear hereafter, the testing arrangement is adapted to automatically distinguish between a ground placed upon conductor 19 due to the unstandard condition and a ground placed on such conductor due to the standard operation. A third and standard condition may also arise if at the particular time when the selector switch is being tested, such selector switch is idle, in which case, the conductor 19 will not be grounded either through the terminal 3 or through the brush 6, in which specific case, as will hereafter appear, the test is automatically abandoned.

Referring now more particularly to the arrangement for carrying out the test and for determining and recording the conditions referred to above, an automatic switch which may be of known construction is provided with terminals 21, 22, 23 and 24, and brushes 25, 26, 27 and 28 which are adapted to be moved step by step over such terminals in response to the energization of a motor magnet at 29. The terminals 21 are connected to the third conductors and outgoing terminals 6 of the selector switches which are to be tested, and also to the third conductors and incoming terminals 3 of the selectors through the vertical off-normal switches 16 of such selectors. Such third conductors are commonly referred to as the private wire or the release trunk. A second row of contacts 22 are connected direct to the third conductors and third incoming terminals 3 of selector switches, and the contacts 23 and 24 are connected to the talking or line conductors and terminals 1 and 2 at the incoming end of the selector switches.

The operation of the testing arrangement will now be described, it being assumed that in response to the throwing of the manual switch indicated at 30, the testing arrangement is set in operation to test a series of selector switches. When the switch 30 is thrown, a circuit is closed, for sequence switch motor magnet 31, which may be traced from battery to the motor magnet 31, through the interrupter 32, to the lower arm of the switch 30 to ground, whereupon the sequence switch 31 is started in motion under the control of the interrupter. At the same time, a circuit is closed from battery to the upper arm of the switch 30 through the sequence switch contact 33 in position 1, magnet 34, through the back contact and armature of a relay 35 to ground. The relay 34 is thereupon energized and attracts its four armatures 36, 37, 38 and 39 thereby connecting test relays 36′ and 38′ to the brushes 25 and 26 of the testing switch. If the brushes 25 to 28 are not already in contact with a row of contacts 21 to 24 connected to a selector switch as above described, the test relay 36' obviously will not operate, so that when the sequence switch reaches position 2, a circuit is closed from battery through the upper arm of the switch 30, sequence switch contact 33 in position 2, relay 35, back contact and armature of relay 36' to ground. Relay 35 is thereupon energized, opening the circuit previously traced for the relay 34. This causes the disconnection of the brushes 25 to 28 from the test relays, and while the sequence switch 31 moves to position 11, no testing operation takes place. When position 12 is reached, however, a circuit is established from the battery through the upper arm of the switch 30, the sequence switch contact 33 in position 12, through magnet 29 to ground. The magnet 29 is momentarily energized as the sequence switch passes through position 12, and the brushes 25 to 28 are advanced to the terminals 21 to 24, to which a selector switch is connected, and it may be assumed, for example, that such row of contacts is the first row shown in the drawing.

It will be assumed, first, that the selector switch connected to this row of contacts is idle, in which case there will be no ground connection on either the incoming or outgoing ends of the third wire or release trunk. Therefore, as the sequence switch 31 reaches position 1, the relay 34 is energized over the circuit previously traced, as in position 2 of the sequence switch, there being no ground on either of the terminals 21 or 22, neither of the relays 38' or 36' are energized. The circuit previously traced for the relay 35 through the back contact and armature of the relay 36 being established, the relay 35 is energized and opens the circuit of relay 34 which thereupon releases its armatures. When the sequence switch 31 again reaches position 12, the energizing circuit for the switch motor magnet 29 is again established, and the brushes 25 to 28 will be advanced another row 21 to 24 of terminals connected with another selector switch.

It will be assumed now, however, that when the brushes 25 to 28 were advanced to the first row of contacts 21 to 24, that a subscriber had, by removing his receiver from its hook, energized the line relay 10, had failed to send the usual controlling impulses and had neglected to return his receiver to its hook. Under these conditions, when the sequence switch 31 reaches position 1, the circuit previously traced for relay 34 is established. Relay 34 attracts its armatures, connecting the test relays 38' and 36' through armatures 38 and 39 to the brushes 25 and 26. If, as assumed, a line relay 10 has been energized, the slow-acting relay 11 will also be energized over a circuit which may be traced from battery through the relay 11, front contact and armature of line relay 10 to ground. Therefore, as soon as the armatures 38 and 39 have been attracted in position 1 of the sequence switch as before described, an energizing circuit is established for the test relay 36' from battery through the relay 36', armature 38 and its contact, brush 26, terminal 22, conductor 19, armature 18 of relay 11 and contact thereof, to ground. If, as assumed, no controlling impulses have been sent into the selector or if the sending of controlling impulses has been abandoned before the call has been extended to another switch, the vertical off-normal contact 16 will be open, so that there will be no energizing circuit for the test relay 38'. As the relay 36' is energized, the relay 35 will not be energized when the sequence switch reaches position 2, owing to the fact that the energizing circuit of such relay previously traced is open at the back contact of relay 36'. However, the energization of the relay 36' will close an energizing circuit for relay 50 which may be traced from battery, through relay 50, conductor 39, back contact and armature of relay 38', front contact and armature of relay 36' to ground. Under these conditions, relay 34 will be maintained energized from positions 1 to 11 of the sequence switch 31, and the relay 50 being energized, a circuit is closed to the brushes 27 and 28 and through such brushes and the contacts 23 and 24 to contacts 1 and 2 which are connected to the subscriber's line, which circuit includes one winding of a transformer 41, to the other winding of which is connected a source of battery 41, an interrupter 42, which together form a signaling device known in the art as a howler. Therefore, during the entire time that the sequence switch 31 is passing between positions 2 to 11, the howler will be connected across the subscriber's line and will produce in the receiver of such subscriber, the characteristic howling tone to call the attention of the subscriber to the fact that he has failed to replace his receiver on the hook. If at any time prior to the sequence switch 31 reaching position 11, the subscriber, in response to the signal given by the howler, replaces his receiver on its hook and thus eliminates the unstandard condition, the ground will be removed from the energizing circuit of the relay 36', causing such relay to fall back and thus reestablishing the previously traced circuit for the relay 35 which, upon energizing, opens the circuit for relay 34. When the sequence switch 31 reaches position 12, the brushes of the testing switch will be advanced to the next set of terminals in response to the energization of the magnet 39, without recording any unstandard condition. If, on the other hand, the unstandard condition is not eliminated by the calling subscriber hanging up his receiver prior to the sequence switch 31 reaching position 11, a circuit is established for the magnet 43, which circuit may be traced from battery, through the magnet 43, sequence switch contact 44 in positions 11 and 12, armature and back contact of relay 38', front contact and armature of relay 36' to ground. The energization of the magnet 43 causes the operation of a suitable stylus or punch indicated at 45, causing such stylus or punch to make a mark upon the strip of paper indicated at 46, thus recording the unstandard condition in such a manner that an attendant from an inspection of such record on the strip of paper 46 may ascertain upon which switch such unstandard condition was found. The magnet 43 when energized also closes at its right-hand armature, a circuit for the relay 35 which may be traced from battery to the upper arm of the switch 30, sequence switch contact 33 in position 11, conductor 47, armature and front contact of magnet 43, to ground. Relay 35 thereupon operates and opens the energizing circuit of relay 34, which, in releasing its armatures restores the relays 36' and 38' and 50 to normal. When the sequence switch 31 reaches position 12, the energizing circuit for the magnet 29 is closed and the brushes 25 to 28 are advanced to the terminals of another selector switch to be tested.

Assuming now the third or standard condition in which the selector switch has been driven through its vertical movement and has extended the connection to another selector or connector switch, under which conditions, as previously explained, there will be a ground of the terminal 9. Under these conditions, when the sequence switch 31 reaches position 1, the relay 34 is energized as in the previous cases, connecting test relays 36' and 38' to the brushes 25 and 26. Under the conditions assumed, an energizing circuit is closed for the test relay 36' from battery, relay 36, armature and contact 38, brush 26, contact 22, conductor 48, vertical off-normal switch 16 which is now closed, conductor 20, brush 6, terminal 9 to ground. It will be observed that the operation of the relay 36' in this case is identically the same as in the previously described case, but at this time, owing to the fact that the ground is on the terminal 9 and is not due to a subscriber leaving his receiver from his switch hook, an energizing circuit is established for the second test relay 38', which may be traced from battery through relay 38', armature and contact 39, brush 25, contact 21, conductor 20, brush 6, terminal 9 to ground. Therefore, under the conditions assumed, which are standard conditions met in the normal operation of the selector switch, both the relays 36' and 38' are energized. Therefore, when the sequence switch 31 reaches position 2 with relays 36' and 38' energized, a circuit is established for the relay 35 from battery, through the upper arm of the switch 30, sequence switch contact 33 in position 2, relay 35, conductor 49, front contact and armature of relay 38', and front contact and armature of relay 36' to ground. The relay 50 is not energized at this time, owing to the fact that the energizing circuit therefor, as previously traced, is open at the back contact of relay 38', so that the howler will not be connected across the line. In response to the operation of the relay 35, the energizing circuit for the relay 34 is opened and the test relays are restored to normal through the deënergization of the relay 34 and no case of trouble is recorded. As in previous cases, when the sequence switch 31 reaches position 12, the magnet 29 is energized and the brushes of the switch are stepped forward to the next terminal for the purpose of testing another selector switch.

It will be apparent from the operation above described that the testing arrangement disclosed will not disturb a selector switch when such selector switch is idle or is operating in the standard manner. If the operation of the selector switch is unstandard, due to the subscriber leaving the receiver off its hook, the testing arrangement automatically connects a signaling device across the subscriber's line for the purpose of notifying the subscriber of the unstandard condition found, and only in case the unstandard condition is not obviated in response to such signal will the testing arrangement record an unstandard condition. It will also appear from the operation of the testing arrangement as above described, that although an electrical condition may exist upon a part of a selector circuit which may in one case indicate the standard operation of the selector and in another the unstandard operation, the testing arrangement will automatically discriminate between such standard and unstandard operation.

In the embodiment of the invention shown in Fig. 2, an arrangement is disclosed for testing for unstandard conditions or faults in a connector switch. That part of Fig. 2 which is above the broken line is a diagrammatic representation of circuits and apparatus associated with a connector switch, and the part below the broken line represents diagrammatically the testing arrangement. The connector switch shown is of the well-known type in which the brush carrying spindle is first stepped vertically under the control of external impulses to bring the brushes opposite the level in which the desired line is to be found, and is then rotated also in response to external control impulses to bring the brush to the contacts of the desired line. This type of connector switch is well known. The usual line relay is indicated at 100, the supervisory relay at 101, the release relay at 102, the primary magnet at 103, cut-off relay at 104, ringing relay at 105, the two slow-acting relays at 106 and 107, the secondary magnet at 109 and the vertical off-normal switch at 110. Side-switch arms are indicated at 111 and 112.

A common unstandard condition in a connector switch of this character occurs when such connector is seized or taken for use by a selector switch, and has failed to complete its normal operation in extending the connection to the terminals of the desired line. As soon as the connector has been taken for use, a ground is placed upon the conductor 132, either due to the operation of the line relay 100 and the consequent operation of the slow-acting relay 106, or to a ground placed upon the terminal 113, through the test brush of the selector switch. If, on the other hand, the operation of the connector has proceeded in the standard manner, there will also be a ground on conductor 137 through the side-switch arm 112 in position 3. The manner in which the test arrangement distinguishes between these two conditions will best be understood from a description of the operation of making such test.

Corresponding terminals 113 and 134 of a plurality of connector switches are connected to rows of terminals 115 and 114 of an automatic switch of a known type. This switch is provided with brushes 116 and 117, which are adapted to be stepped from one row of terminals to the next during intermittent energization of the stepping magnet 118. Associated with this switch are test relays 119 and 120, a wipe-out relay 121, a connecting relay 122, a recorder, the magnet of which is indicated at 123, and a sequence switch indicated at 124. A manual switch is indicated at 125 and an interrupter is indicated at 126.

Let it be assumed that the brushes 116 and 117 are in contact with a row of terminals 114 and 115 which are connected to a connector switch which has been taken for use and which has failed to operate in the standard manner. Under these conditions, when the manual switch 125 is thrown, a circuit is established from ground through the lower arm of the manual switch 125, through the interrupter 126, to the sequence switch motor magnet 124 to battery. The sequence switch thereupon begins to rotate under the control of the interrupter 126. At the same time, a circuit is closed from battery 127 through the sequence switch contact 128, in position 1, connecting magnet 122, back contact and armature of the relay 121 to ground. Connecting magnet 122 is thereupon energized and by the attraction of its armatures 129 and 130 connects the conductors leading to the test relays to brushes 116 and 117. Remembering that in the case assumed, due to the unstandard operation of the connector, there is a ground upon the conductor 132 and no ground upon the conductor 137. As the sequence switch passes through positions 1 and 2, a circuit is established for the test relay 120 from battery through the test relay 120, sequence switch spring 131 in positions 1 and 2, armature and sequence switch contact 130, brush 117, contact 115, conductor 132, and from thence to ground either by way of terminal 113 or by way of the left armature and front contact of relay 106. When the sequence switch reaches position 3, there will be no energizing circuit for the test relay 119 as in the case assumed there is no ground upon the terminal 114. Therefore, when the sequence switch reaches position 4, the relay 120 being energized, a circuit is closed for the recorder magnet 123 from battery, through the magnet 123, back contact and armature of the relay 119, sequence switch contact 131 in position 4, front contact and armature of the relay 120 to ground. The recorder magnet when operated causes a stylus, punch or other marking device to make a mark upon the strip of paper 133, from an inspection of which an attendant can determine in which selector switch the unstandard condition has been found. As soon as the recorder magnet 123 has operated, the sequence switch still being in position 4, an energizing circuit for the wipe-out relay 121 is closed from battery 127, upper arm of the manual switch 125, sequence switch contact 128 in position 4, wipe-out relay 121, armature 136 and front contact of the recorder magnet 123. The energization of the relay 121 opens the energizing circuit previously traced for the magnet 122 which releases and opens the energizing circuit for the relay 120, restoring the test relay 120 to normal. As the relay 120 releases, the energizing circuit of the recorder magnet 123 is opened, but the wipe-out relay 121 will not be released until the sequence switch has left position 4, as such relay, when energized, closed at its front contact and armature, a locking circuit, independent of the circuit closed at the armature 136. When the sequence switch reaches position 5, the locking circuit of the wipe-out relay 121 is opened and a circuit is momentarily closed for the magnet 118 which steps the brushes 116 and 117 to another row of contacts 114 and 115 to which another connector switch is connected.

Let it be assumed now that the connector switch to which the testing apparatus is connected through the brushes 116 and 117 and the contacts 114 and 115 has operated in the standard manner, in which case there will be, as previously explained, a ground upon the conductor 132, as well as a ground upon the conductor 137. Under these conditions, as the sequence switch reaches position 1, the relay 122 will be energized over the circuit previously traced, the test relay 120 will be energized as before, and as the sequence switch reaches position 3, an energizing circuit is established for the test relay 119, which may be traced from battery through relay 119, sequence switch spring 118 in positions 3 and 4, armature and contact 129, brush 116, contact 114, conductor 137, side-switch arm 112 in position 3 to ground. Therefore, in positions 3 and 4 of the sequence switch, the relay 119 is energized so that when the sequence switch reaches position 4, the energizing circuit previously traced for the recorder magnet 123 is open at the back contact of such relay 119. Therefore, the recorder magnet does not operate and an unstandard condition is not recorded. When the sequence switch reaches position 4, the energizing circuit for relay 122 is opened and the relay 122 in releasing its armatures opens the circuits of the test relays 119 and 120. As the sequence switch passes position 5, the stepping magnet 118 is momentarily energized and the brushes 116 and 117 are advanced to the next row of terminals. Still another condition may be present in a connector switch when the test is made, that is, the connector switch may be idle, in which case there will be no ground on the conductor 132 or on the conductor 137. Under these conditions, the relay 122 having been operated as before in position 1, the relay 120 will not pull up in positions 1 and 2 and the relay 119 will not operate in positions 3 and 4. Therefore, as the sequence switch reaches position 2, a circuit will be closed for the wipe-out relay 121 from battery 127 through the upper arm of the switch 125, sequence switch contact 128 in position 2, relay 121, back contact and armature of relay 120 to ground. The operation of relay 121 opens and maintains open the energizing circuit for the relay 122 until the sequence switch has left position 4. In position 5 of the sequence switch as in the case previously described, the circuit is closed for the stepping magnet 118 and the brushes are advanced to another row of contacts.

The arrangement shown in Fig. 3 of the drawings is a modification of the arrangement shown in Fig. 1 and is designed to perform the same tests. The purpose of the modified arrangement, however, is to merely test for unstandard conditions and no provision is made for signaling the subscriber to replace the receiver on the hook. The selector switch and circuits above the broken line are in all respects identical with the selector shown in Fig. 1 and as in the case of the arrangement already described, the unstandard condition is manifested by a ground on the conductor 19, while standard conditions are indicated by grounds of both conductors 19 and 20, and no ground on either conductor 19 or 20. Similar reference characters have been used to indicate corresponding apparatus and circuits in Figs. 1 and 3.

As no provision is made for placing the howler signal on a calling line which may be connected to the selector under test, the testing operation may be completed in a shorter time than was the case in the previously described arrangement. Therefore the sequence switch 31 is provided with only five positions.

The operation of the arrangement, assuming that an unstandard condition exists in the selector switch under test and that the testing arrangement has been started in operation by the closure of the switch 30. Under conditions assumed, the relay 11 will be energized and when the brushes 25 and 26 make contact with the terminals 21 and 22, there will be a ground on terminal 22 and no ground on terminal 21. With the sequence switch in position 1, relay 34 is energized over a circuit from battery, upper arm of switch 30, contact 33 (position 1), relay 34, back contact and armature of relay 35 to ground. As soon as relay 34 is energized, test relay 136 is energized over a circuit from battery, relay 136, contact 52 (positions 1 to 4) armature and contact 38 of relay 34, brush 26, terminal 22, conductor 19 to ground at outer armature and contact of relay 11. No circuit will be closed for relay 137 under the conditions assumed so that when the sequence switch reaches position 4, a circuit is closed for the recorder magnet 43, from battery, recorder magnet 43, back contact and armature of relay 137, contact 52, position 4, front contact and armature of relay 36 to ground. The recorder magnet attracts its armature 45 and a record of the unstandard condition is made on the strip 46. In position 5 of the sequence switch, the magnet 29 is energized and the switch is stepped forward to the next row of contacts.

What is claimed is:

1. An arrangement for determining and recording unstandard conditions in electrical circuits and apparatus, comprising testing means responsive to an electrical condition in the circuits indicating either an unstandard condition or a standard condition, recording means controlled from said testing means, and means responsive only to a standard condition for removing the recording means from the control of the testing means.

2. An arrangement for determining and recording unstandard conditions in electrical circuits and apparatus, comprising testing means responsive to a potential indicating an unstandard condition, a signaling apparatus controlled from such testing means, recording means also controlled from such testing means, and means for preventing the operation of the recording means in case the unstandard condition is eliminated in response to the operation of such signaling apparatus.

3. An arrangement for determining and recording unstandard conditions in electrical circuits and apparatus, comprising testing means responsive to an electrical condition indicating the existence of an unstandard condition, a signaling apparatus controlled from such testing means, recording means also controlled from such testing means, means for delaying the operation of the recording means until the signaling apparatus has operated for a predetermined time interval, and means for preventing the operation of the recording means in case the unstandard condition is eliminated in response to such signaling means.

4. An arrangement for testing for unstandard operations in automatic apparatus used in establishing a telephonic connection, comprising contacts connected to controlling circuits of such apparatus, testing means responsive to an electrical potential in such control circuits indicating an unstandard operation of such apparatus, automatic means for associating such testing means with such contacts, and means controlled by such testing means to indicate the existence of the unstandard operation.

5. Testing arrangement for determining unstandard conditions in a telephone exchange system, comprising contacts electrically connected to the various points of such telephone system which are to be tested, electroresponsive means responsive to an electrical condition on such contacts indicating an unstandard condition at the point to which the particular contact is connected, and automatic means for successively associating said electroresponsive means with a plurality of such contacts.

6. An arrangement for determining unstandard conditions in an automatic switch used for establishing telephonic connection, comprising a plurality of contacts connected to test circuits of a plurality of such switches, testing means responsive to a potential on such test circuits indicating unstandard condition, and means for automatically and successively associating such testing means with such contacts and with such testing conductors.

7. An arrangement for testing unstandard conditions in a selector switch, comprising a testing arrangement responsive to an electrical condition on the third or test wire of such selector switch indicating an unstandard condition, automatic means for associating such testing means with such third or test conductor, and means controlled by such testing means for indicating such unstandard condition.

8. An arrangement for testing for the unstandard conditions in a selector switch, comprising a pair of contacts, one connected to either end of the third or release conductor of such switch, a pair of brushes cooperating with such contacts, testing means responsive to a potential on such release trunk associated with each of such brushes, one of such testing means being responsive to such potential when it exists on either end of the release trunk, and another testing means responsive to such potential only when on the one end of said trunk, and means controlled jointly by such testing means for indicating an unstandard condition.

9. An arrangement for determining unstandard conditions in an automatic selector switch, comprising means for testing the electrical condition at both ends of the third or test conductor of such switch, means for testing the electrical condition at one end only of the third or test conductor of such switch, and means for indicating an unstandard condition controlled jointly by both of such testing means.

10. An arrangement for determining unstandard conditions in telephone exchange apparatus, comprising contacts connected to the apparatus to be tested, testing means responsive to the existence of an unstandard condition, means for associating such testing means with such contacts, and means for disconnecting such testing means if the apparatus under test has not been taken for use.

11. Arrangement for determining unstandard conditions in telephone exchange apparatus, comprising means for testing for such unstandard conditions, means for associating such testing means with the apparatus to be tested, and means for disconnecting such testing means if no unstandard condition exists.

12. An arrangement for determining unstandard operations in a selector switch, comprising testing means responsive to an electrical condition indicating that such switch has been taken for use, testing means responsive to an electrical condition indicating that such switch has been taken for use and is operating in a standard manner, and indicating means controlled jointly by said testing means for indicating that the switch has been taken for use and is not operating in the standard manner.

13. Arrangement for determining unstandard conditions in an automatic switch used for establishing a telephonic connection, comprising testing means responsive to an electrical condition indicating an unstandard condition in the switch under test, means for connecting said testing means with the switch under test, and means for immediately thereafter disconnecting the testing means if no unstandard condition exists.

14. In a telephone exchange system, apparatus adapted to be associated with a subscriber's line, testing means adapted to operate in response to an electrical condition in such apparatus indicating that a subscriber has failed to replace his receiver on its hook, means for connecting said testing means to the apparatus to be tested, and automatic means controlled by such testing means for signaling the subscriber's substation for the purpose of notifying the subscriber that his receiver is off the hook.

In witness whereof, I hereunto subscribe my name this 20th day of July, A. D. 1916.

HENRY P. CLAUSEN.